United States Patent [19]
Ayres et al.

[11] 3,917,860
[45] Nov. 4, 1975

[54] COOKED TEXTURED POULTRY PRODUCT AND METHOD FOR PREPARING SAME

[75] Inventors: James L. Ayres, Stone Mountain; Jeffery D. Peterson, Decatur; Robert C. Steele, Conyers, all of Ga.

[73] Assignee: Gold Kist Inc., Atlanta, Ga.

[22] Filed: Nov. 29, 1973

[21] Appl. No.: 420,230

[52] U.S. Cl. ............... 426/644; 426/656; 426/657; 426/507; 426/519; 426/528
[51] Int. Cl.² ...................... A23J 3/00; A23L 1/31
[58] Field of Search ........... 426/104, 205, 212, 224, 426/276, 332, 364, 371, 211

[56] References Cited
UNITED STATES PATENTS

| | | | |
|---|---|---|---|
| 3,253,931 | 5/1966 | Coleman et al. | 426/211 |
| 3,617,307 | 11/1971 | Inklaar | 426/212 |
| 3,662,672 | 5/1972 | Hoer | 426/205 |

*Primary Examiner*—Hyman Lord
*Attorney, Agent, or Firm*—Bacon & Thomas

[57] ABSTRACT

A cooked poultry food product having the appearance and characteristics of cooked ground beef, i.e., cooked, ground hamburger meat. The product is prepared by blending raw, comminuted poultry with a textured, vegetable protein and cooking the resultant mixture in broth.

11 Claims, No Drawings

COOKED TEXTURED POULTRY PRODUCT AND METHOD FOR PREPARING SAME

BACKGROUND OF THE INVENTION

1. Field of the Invention

The present invention relates to a process for the preparation of a finely ground, cooked poultry product, which is prepared from poultry and a textured vegetable product, having the appearance of a cooked, ground beef, but which does not have a poultry flavor.

2. Description of the Prior Art

Although poultry meat products are substantially cheaper than beef and pork products they are not as widely accepted by consumers as meat sources of protein. One reason for this is that certain consumers find the distinctive poultry flavor or poultry taste that such products possess objectionable. Comminuted chicken products, however, are used at levels of up to about 15% by weight in a wide variety of emulsion-type meat products, such as frankfurters, viennas, and the like. Owing to their lower cost, it would be desirable to use poultry products as substitutes for the cooked, hamburger-like products used in the preparation of chili, Brunswick stew, pizza, and various spaghetti and casserole dishes. Unfortunately, poultry meats cannot be readily substituted for the pork and beef products normally used in such dishes without markedly changing their flavor because of the characteristic cooked poultry flavor that results when poultry products are used as a constituent in various food dishes.

Under the U.S. Department of Agriculture, Food and Nutrition Service guidelines, a maximum of 30% of hydrated textured vegetable protein can be used as a replacement for red meat, poultry or fish in preparing school children's lunches under the Federal Child Nutrition Programs. Because of their lower costs, hamburger-type meats are widely used for institutional use such as school lunch programs. Further savings could, of course, be realized without sacrificing nutritional values, by using poultry, in particular chicken, substitutes in such large-scale institutional food programs. However, one problem that must be overcome with poultry substitutes is the avoidance of "cooked chicken" type flavors, in those dishes where such flavors are not normally expected.

By the process of the present invention, it is now possible to utilize a cooked textured poultry product containing hydrated textured vegetable protein as a substitute for cooked ground beef, which does not have a poultry-like flavor. The final, fully cooked poultry product of the present invention has uniform texture, protein, and fat composition. Use of the cooked poultry product prepared according to the present invention as a substitute for cooked ground beef, i.e., cooked ground hamburger meat, results in a costs savings of about 20-30%. In addition to cost savings, the cooked poultry product of the present invention has an excellent protein to fat ratio, and is free of various pathogenic microorganisms and can be included in recipes requiring short heating times to allow for warming and flavor transfer from sauce to meat.

SUMMARY OF THE INVENTION

The present invention broadly provides a method for preparing a cooked poultry food product comprising:

a. blending 65–75 parts by weight of raw, comminuted poultry with 35–25 parts by weight of a comminuted, hydrated textured vegetable protein, the vegetable protein being derived from one part by weight of water and one part by weight of unhydrated textured vegetable protein;

b. cooking the resultant mixture in (a); by contacting it with water, salt water, beef bouillon, or beef stock at about 170° to 212°F, and c. cooling the cooked product to provide a cooked textured poultry product that does not have a poultry flavor.

The use of chicken as the poultry and protein derived from soybean as the textured vegetable protein is especially preferred.

In an especially preferred method for preparing a cooked chicken food product, 70 parts by weight of raw, comminuted chicken is blended with 15 parts by weight of unhydrated, textured vegetable protein, and the resultant mixture is cooked by contacting the mixture at 170°–212°F with water, beef bouillon, beef stock, or salt water. The product is then cooled to provide a cooked, textured chicken product, which is free from any chicken flavor.

The cooked, textured poultry product of the present invention is especially useful as a replacement for cooked, chopped beef, i.e., hamburger meat, in various food dishes. The ground, cooked poultry product of the present invention can be substituted for ground beef at any ratio in such dishes as chili, Brunswick stew, sloppy joes, pizza, tamale pie, lasagna and various other dishes. The product blends readily with various seasonings and other foodstuffs, thereby requiring a minimum of preparation time.

DETAILED DESCRIPTION OF THE INVENTION

The present invention concerns a method for preparing cooked, poultry food products wherein 65–75 parts by weight of raw, comminuted poultry is thoroughly blended with 35–25 parts by weight of a comminuted, hydrated textured vegetable protein, followed by broth cooking and cooling the resultant product to give a cooked textured poultry product. It has been surprisingly and unexpectedly discovered that poultry products prepared according to the present invention are substantially free of any poultry flavor and color. The hydrated textured vegetable protein, preferably one derived from soybean, is prepared from one part by weight of water and one part by weight of unhydrated textured vegetable protein. The water can either be added to the unhydrated vegetable protein separately, or absorbed from the broth during cooking.

Although various poultry meats can be used in practicing the invention, finely ground chicken (comminuted chicken) and finely ground chicken meat (comminuted chicken meat) are specifically preferred since the protein of these products is of good quality and the meat is substantially cheaper than hamburger. The U.S. Department of Argiculture (M.P.I.P) defines "comminuted chicken" as ground chicken without bones containing up to a natural proportion of skin and various allowable organs. "Comminuted chicken meat" is ground chicken meat and cannot contain skin or organs. Generally, comminuted chicken has more fat than protein, while in comminuted chicken meat the reverse is true. This difference is due to the high level of fat normally found in chicken skin.

In the present invention, the expression "chicken" is to be understood as including both comminuted chicken and comminuted chicken meat, as defined by U.S. Department of Agriculture standards. Similarly, "poultry" is intended to include all edible poultry products, such as backs, necks, and frames, obtainable not only from chickens and turkeys, but from all those members of the poultry family used for food use.

As mentioned above, the comminuted poultry, such as comminuted chicken meat is thoroughly blended with a textured vegetable protein, preferably one derived from soybean. An especially preferred commercial product is that sold under the tradename "MIRA-TEX," by the A. E. Staley Manufacturing Company, Decatur, Ill. 62525. Another commercial product that can be used is available from Cargill Incorporated, Carpentersville, Ill. 60110 under the designation F-18 TVP. These products are both soybean derivatives.

The "textured vegetable protein" used herein is a tough, resilent, dry to semi-dry (unhydrated), open celled, funicular structure made up of interlaced, interconnected funiculi of varying width and thickness. This product is derived from proteinaceous, solvent-extracted oil seed material, in particular from such oil seeds as soybean, cotton seed, peanut, sesame seed, castor beans, sunflower seed, and the like. Textured vegetable protein derived from soybean is particularly preferred. These materials are more fully described in U.S. Pat. No. 3,488,770.

When hydrated with varying amounts of water the textured vegetable protein becomes hydrated, giving a product having the texture, appearance, and coherence of cooked meat. Hence the designation "textured."

In blending the finely ground poultry with the textured vegetable protein, it is preferred that the poultry be blended with a hydrated vegetable protein while still in a frozen state. When finely ground chicken meat is thawed, it generally resembles a thick pudding and is usually difficult to blend with textured vegetable protein or handle after blending. No problem arises, however, if the blended material is thawed after blending.

In blending chicken and the textured vegetable protein, the best results are obtained with a mixture of from 65-75% by weight chicken and 25-35% by weight hydrated textured vegetable protein. Especially preferred is a formulation of 70 parts by weight chicken, 15 parts by weight unhydrated textured vegetable protein and 15 parts by weight of water. When less than 65% chicken is present by weight in the blend, textured vegetable protein is clearly visible in the final product and the product does exhibit some soybean flavor. With levels of more than 75% by weight of chicken in the blend, the cooked product lacks a cooked hamburger texture and possesses to some degree a "gizzard-like" flavor.

The hydrated textured vegetable protein is preferably prepared by taking one part by weight of unhydrated textured vegetable protein and mixing it with one part by weight of water. Optimum results are obtained with textured vegetable protein particles having a particle size of from about 0.03 to 0.20 inches in diameter. Best results are obtained with an unhydrated textured vegetable protein particle size of from 0.03 to 0.10 inches in diameter.

After the poultry and hydrated textured vegetable protein are thoroughly blended, the mixture is then broth cooked.

For large scale processing, broth cooking, using a conventional "thermascrew" is particularly advantageous.

The thermascrew is a heated screw conveyor consisting essentially of a spiral or helical blade revolving about its axis and is positioned within a large drum or cylinder so that its axis is parallel to the longitudinal axis of the drum or cylinder. The material to be heated in the cylinder is conveyed through the cylinder by the moving, continuous helical rib of the rotating screw. In the instant process, the broth fills the entire void of the cylinder and is heated to the required temperature by means of a steam-heated jacket that surrounds the outer surface of the cylinder.

In this procedure, large blocks of frozen, raw, comminuted finely ground poultry are cut with a meat saw into pieces small enough to be placed into a meat grinder while still in a frozen condition. The frozen pieces of poultry are then ground and thoroughly blended with the textured vegetable protein.

After blending, the mixture is then passed through a second meat grinder and the chopped blend is passed into a conventional thermascrew for the actual cooking operation.

The cooking broth in the thermascrew is generally kept at a temperature from about 200°-212°F and the cooked meat which exits the thermascrew is generally at a temperature at about 180°F.

Water, beef bouillon, beef stock, and salt water are the preferred cooking broths. Beef bouillon provides the best flavored textured cooked poultry meat product, especially with chicken based products. A particularly preferred cooking broth for use with the thermascrew is a bouillon broth comprised of 1.45% beef bouillon and 98.55% water.

After exiting from the thermascrew at a temperature of about 180°F, the cooked product is passed through a straining belt containing a catch basin to collect the broth strained from the meat.

The broth collected in the catch basin is introduced to a steam jacketed kettle, for reheating to a temperature of about 200°-210°F, and then recycled to the entrance of the thermascrew. Additional fresh broth may be added to the steam jacketed kettle from time to time to maintain the broth level to compensate for broth absorption by the product and steam evaporation.

The cooked poultry meat is then conveyed from the screening belt to a freezer. After passage through the freezer, the frozen meat is suitably packaged for further use.

Alternatively, the broth cooking can be carried out by batch processing in suitable kettles using a broth temperature of from about 170° to 212°F. The cooking time is a function of the broth temperature, with shorter cooking times being realized at the higher temperatures. When a thermascrew is used the cooking time, that is the time required for passage through the thermascrew is also a function of the broth temperature. Thus, when the broth temperature is at 200°F, a cooking time of about 11 minutes is required. At higher temperatures, such as 212°F, a cooking time of about 4-6 minutes has been found to be adequate.

In cooking the blend of the raw comminuted poultry meat and the textured vegetable protein, it is desirable to cook the blend until the interal temperature of the product is about 170°F.

As mentioned previously, it is not absolutely necessary to hydrate the textured vegetable protein by the addition of water to the unhydrated vegetable protein before broth cooking. By blending the necessary amounts of the raw, comminuted poultry with unhydrated textured vegetable protein and cooking the resultant mixture in broth, the necessary water needed to hydrate the textured vegetable protein can be obtained from the broth. The use of unhydrated vegetable protein has the advantage of permitting the poultry product to be cooked at a faster rate and also requires less labor. Further, the flavor of the finished product is superior where a seasoned broth is used because the broth is absorbed into the product and the flavor transfer is much better.

The following examples are provided to illustrate various aspects of the invention, but should not be construed as limiting the scope of the invention.

EXAMPLE 1

70 parts of finely ground (comminuted) chicken meat was blended with 30 parts by weight of hydrated, textured vegetable protein, derived from soybean (soy flour), prepared by mixing 15 parts by weight of the unhydrated textured vegetable protein with 15 parts by weight of water. The resultant mixture was ground with a meat grinder through ⅜-inch plates. 227 grams of the textured raw chicken meat product was placed in a vegetable strainer, 7 inches in diameter by 4 inches deep, containing ⅛-inch mesh openings. The strainer containing the meat was then lowered into 454 grams of broth and cooked until the internal temperature of the product was at least about 170°F (usually about 5 minutes) and no visible redness of the finished product could be determined by visual inspection.

The following cooking broths were used:

COOKING BROTH 454 grams of water
454 grams water and 8.32 grams beef bouillon[1]
454 grams water and 3.54 grams beef stock (dry)[2]
454 grams water plus 4.16 grams sodium chloride

[1]Wylers Bouillon (salt, hydrolyzed vegetable protein, malto dextrin, sugar, beef fat, water, monosodium glutamate, flavoring, corn sugar, beef extract, caramel color, hydrogenated vegetable fat, U.S. certified food color).
[2]Hormel-Dried Beef Stock. Diluted to maximum dilution for label description of "beef stock."

In each case the cooked product had no "chicken flavor" and had the appearance of cooked, hamburger meat. The beef bouillon provided the best flavored textured meat.

EXAMPLE 2

25–50 lb. blocks of frozen, raw, comminuted finely ground chicken were cut with a Toledo High Speed Meat Saw, Model 5206, Toledo Scale Company, Toledo, Ohio, into pieces sufficiently small enough to fit into a meat grinder while still in a frozen condition. The frozen pieces of ground chicken were then chopped through a six-hole plate, each hole 2 inches in diameter, using a Buffalo Grinder, (Model 66–B6, available from John E. Smith & Sons, Co., Buffalo, N.Y. The meat was then blended with unhydrated textured vegetable protein (MIRA-TEX 230-F, A. E. Staley Manufacturing, Decatur, Ill.) 70 parts by meat to 15 parts of textured vegetable protein. The meat and vegetable protein was blended with a Buffalo Model 3 Paddle Mixer, (John E. Smith & Sons, Co., Buffalo, N.Y.). The blended chicken-textured vegetable mixture was then passed through a second meat grinder (Butcher Boy, Model A42-F, Lasar Manufacturing Co., Inc., Los Angeles, Calif.) equipped with a plate containing ⅜-inch holes.

The meat textured vegetable protein blend was then metered into a Rietz Thermascrew, Model TL-12, (Rietz Manufacturing Co., Santa Rosa, Calif.). The Thermascrew was equipped with a 12-inch diameter by 15-foot long steam heated (60 p.s.i.g. steam) screw, and was equipped with steam injection ports (12 p.s.i.g. steam). The meat-textured vegetable protein blend was metered to the thermascrew at approximately 400–1,000 lbs. per hour. The cooking broth was comprised of 98.55% water and 1.45% of beef bouillon, by weight. Approximately 900–1,000 lbs. per hour of the blend were cooked using broth which was at a temperature of 200°–210°F entering the screw. The mean passage time of the product through the thermascrew was about 4.5–5.0 minutes.

The cooked meat exited the thermascrew at a temperature of about 180°F onto a straining belt equipped with a ¼-inch mesh belt, having a 36 × 30 inch straining surface and a catch basin to collect the broth strained from the meat. The straining belt was a Recolorizer Model SLS-1, (E. I. duPont Nemours & Co., Wilmington, Del.) which had the steam lines removed. The strainer belt speed was adjusted to allow the meat to drain sufficiently, but not slow enough to allow the product to cool unduly. A mean drain time of approximately 2 minutes was found to be entirely adequate.

The broth that drained from the cooked product was collected in a catch basin and passed through a 1½-inch stainless sanitary pipe to a 60-gallon steam jacketed kettle for reheating to 200°–210°F. The broth was continuously pumped with a variable speed sanitary pump (Waukasha Sanitary Pump, Model 10) through a sanitary pipe to the entrance of the thermascrew. Additional fresh broth was added to the steam jacketed kettle, either continuously or periodically, to maintain the broth at a proper level to compensate for absorption and steam evaporation.

After straining, the cooked meat was conveyed from the screening belt to a freezing belt, 48 inches wide by 33 feet long (Kryos Liquid Nitrogen Freezer, Union Carbide Corporation, Linde Division, Tonawanda, N.Y.) and sprayed with liquid nitrogen. The product entered the freezer at approximately 170°F and exited the freezer at approximately 20°–25°F and was completely frozen. The belt speed of the freezer was set at about 2 feet/minute. The product was frozen at a rate of about 800–1200 lbs./hour by adjusting the liquid nitrogen flow on the freezer. The entrance gate of the freezer was adjusted to apply a thin (¾ to 1 inch) layer of cooked product on the freezer belt. The meat was removed from the belt using a doctor blade held against the belt by means of spring tension. The frozen, cooked textured chicken product was then packed in 10 lb. bags.

The product did not exhibit any chicken flavor when used to prepare various food dishes and had the characteristic appearance of cooked chopped hamburger meat.

What is claimed is:

1. A method for preparing a poultry food product which comprises:

a. blending 65–75 parts of raw, comminuted poultry with 35–25 parts of comminuted, hydrated textured vegetable protein having a particle size of about 0.03–0.20 inches in diameter, the hydrated textured vegetable protein being derived from one part water and one part of unhydrated textured vegetable protein;
b. cooking the resultant mixture in (a) by contacting it at about 170°–212°F with a cooking broth, wherein said cooking broth is water, salt water, beef bouillon, or beef stock until the internal temperature of the mixture is about 170°F; and
c. cooling the cooked product to provide a cooked, textured poultry product having the appearance of cooked ground beef which does not have a poultry flavor.

2. The method of claim 1 wherein 70 parts by weight of poultry is blended with 30 parts by weight of hydrated textured vegetable protein.

3. The method of claim 1 wherein the raw, comminuted poultry is frozen chicken.

4. The method of claim 1 wherein the textured vegetable protein is derived from soybean.

5. The method of claim 1 wherein the cooked product in (c) is cooled to a frozen state.

6. The method of claim 1 wherein the mixture obtained in (a) is cooked in (b) by being helically transported through the cooking broth.

7. A method for preparing a cooked, chicken food product which comprises the steps of:
a. blending 70 parts of raw, unhydrated comminuted chicken with 15 parts of comminuted unhydrated texture vegetable protein having a particle size of about 0.03–0.20 inches in diameter;
b. cooking the resultant mixture in (a) by contacting the mixture at 170°–212°F with a cooking broth, wherein said cooking broth is water, beef bouillon, beef stock or salt water and
c. cooling the cooked product to provide a cooked, textured chicken food product having the appearance of ground beef which does not have a chicken flavor.

8. The method of claim 7 wherein the textured vegetable protein is derived from soybean.

9. The method of claim 7 wherein the textured vegetable protein is derived from soybean, the raw, comminuted chicken in (a) is frozen and the cooked product in (c) is cooled to a frozen state.

10. The method of claim 7 wherein the cooking broth is beef bouillon.

11. The product of the process of claim 1.

* * * * *